(12) United States Patent
Patel (10) Patent No.: US 10,817,661 B2
(45) Date of Patent: *Oct. 27, 2020

(54) SYSTEM ARCHITECTURE FRAMEWORK

(71) Applicant: Bank of America Corporation, Charlotte, NC (US)

(72) Inventor: Akshay Patel, Cary, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/568,552

(22) Filed: Sep. 12, 2019

(65) Prior Publication Data

US 2020/0019452 A1    Jan. 16, 2020

Related U.S. Application Data

(63) Continuation of application No. 15/376,909, filed on Dec. 13, 2016, now Pat. No. 10,452,774.

(51) Int. Cl.
*G06F 40/18* (2020.01)
*G06Q 10/10* (2012.01)
(Continued)

(52) U.S. Cl.
CPC .......... *G06F 40/18* (2020.01); *G06F 9/45512* (2013.01); *G06F 9/546* (2013.01); *G06F 11/0766* (2013.01); *G06Q 10/103* (2013.01)

(58) Field of Classification Search
None
See application file for complete search history.

(56) References Cited

U.S. PATENT DOCUMENTS 6,775,824 B1    8/2004  Osborne, II et al.
6,934,934 B1    8/2005  Osborne, II et al.
(Continued)

OTHER PUBLICATIONS

Honaker, James, Gary King, and Matthew Blackwell. "Amelia II: A program for missing data." Journal of statistical software 45, No. 7 (2011): 1-47. (Year: 2011).*

(Continued)

*Primary Examiner* — Frank D Mills
(74) *Attorney, Agent, or Firm* — Weiss & Arons LLP; Michael A. Springs, Esq.

(57) ABSTRACT

Methods for operating a system architecture framework are provided. Methods may include receiving a spreadsheet file. Methods may include creating a plurality of message files at a message generator. Each message file may correspond to a single row of data included in the spreadsheet file. Methods may include transmitting the plurality of message files to a UNIX-based server. Methods may include handshaking using a shell script located on the UNIX-based server, between the server and the message generator. Methods may include transmitting an instruction to the message generator to initiate message transmission from the message generator to the server. The instruction may be triggered in response to the shell script determining that the message generator has completed message generation. Methods may include performing a validation test on each of the message files. The validation test may compare each message file to the corresponding row in the spreadsheet file.

5 Claims, 9 Drawing Sheets

(51) Int. Cl.
*G06F 9/455* (2018.01)
*G06F 9/54* (2006.01)
*G06F 11/07* (2006.01)

(56) References Cited

U.S. PATENT DOCUMENTS

| | | | |
|---|---|---|---|
| 7,000,224 | B1 | 2/2006 | Osborne, II et al. |
| 7,673,179 | B2 | 3/2010 | LaBanca et al. |
| 7,694,181 | B2 | 4/2010 | Noller et al. |
| 7,822,710 | B1 * | 10/2010 | Miller .................. G06F 16/907 707/620 |
| 8,060,483 | B2 | 11/2011 | Haub et al. |
| 8,386,419 | B2 | 2/2013 | Yalamanchilli |
| 8,407,664 | B2 | 3/2013 | Moosmann et al. |
| 8,448,137 | B2 | 5/2013 | Kaetker et al. |
| 8,621,434 | B2 | 12/2013 | Campion et al. |
| 9,021,443 | B1 | 4/2015 | Lachwani et al. |
| 9,122,460 | B2 | 9/2015 | Williamson |
| 9,262,193 | B2 | 2/2016 | Hicks et al. |
| 9,414,360 | B2 | 8/2016 | Sadeghi et al. |
| 9,628,444 | B1 * | 4/2017 | Glazemakers ...... H04L 63/0227 |
| 2007/0265862 | A1 * | 11/2007 | Freund .................. G06Q 10/067 719/315 |
| 2009/0083325 | A1 | 3/2009 | Belide et al. |
| 2016/0292206 | A1 * | 10/2016 | Ruiz Velazquez ........................... G06F 16/2358 |

OTHER PUBLICATIONS

"What is Micro Strategy? Definition from WhatIs.com", Retrieved from http://searchbusinessanalytics.techtarget.com/definition/MicroStrategy, TechTarget Nov. 2010.
"What is IP Multimedia Subsystem (IMS)?—Definition from WhatIs.com," Retrieved from http://searchtelecom.techtarget.com/definition/IP-Multimedia-Subsystem-IMS, TechTarget, Jul. 2007.
"Acquisition & Control Framework," Retrieved from http://cms-project-tk-ph2daq-doxygen.web.cern.ch.cms-project-tk-pj2daq-doxygen/main.html, Feb. 4, 2016.
"Aries Applications," Retrieved http://aries.apache.org/modules/applications.html, Available as of Dec. 1, 2016.
"Compliance Corner," Retrieved from http://www.fircosoft.com/solutions/watch-list-filtering/compliance/, FircoSoft, Available as of Dec. 1, 2016.
"Connect: Direct," Wikimedia Foundation, Inc., Jan. 28, 2016.
"Mockaroo—Random Data Generator," Retrieved from https://www.mockaroo.com/ Mockaroo, LLC, Available as of Dec. 1, 2016.
"FileAct," Retrieved from https://www.swift.com/our-solutions/global-financial-messaging/fileact/, Available as of Dec. 10, 2015.
"FircoSoft—About Us," Retrieved from http://www.ficrosoft.com/about/, Available as of Dec. 1, 2016.
"IBAN Complete," Retrieved from https://ibancomplete.com/iban-pr/, Available as of Dec. 1, 2016.
"IBM WebSphere MQ," Wikimedia Foundation, Inc., Nov. 21, 2016.
"Middleware SEPA (IOM)," SIA S.p. A., Jan. 7, 2016.
Jeremy F. Shapiro, "Modeling the Supply Chain," book, Cengage Learning, Second Edition, pp. 43, 47, 48, 362, 387 (Relevant portions attached herewith), Oct. 17, 2006.
"Payments Maintenance camt053, camt.054, camt.052," Retrieved from http://wiki.xmldation.com/General_Information/ISO_20022/Payments, Available as of Nov. 30, 2016.
Natalia Vasylyna, "Sanity Testing vs. Regression Testing," QAtestlab Blog, Dec. 14, 2015.
Dave Mills, German Schumacher, and Paul Lotz, "LSST Communications Middleware Implementation", LSST, Arizona, Jul. 27, 2016.
"GoldenGate Statement of Direction," Oracle Corporation, Jul. 2016.
"Middleware (distributed applications)," Wikimedia Foundation, Inc., Nov. 14, 2016.
Girish Balilga, P.R. Kumar, "A Middleware Architecture for Federated Control Systems", IEEE Distributed Systems Online, Mar. 25, 2012.
"Regression Testing," Retrieved from http://qatestlab.com/services/step-by-step/regression-testing/, Available as of Dec. 1, 2016.
Honaker et al., "Amelia II: A Program for Missing Data," https://www.jstatsoft.org/article/view/v045j07, Journal of Statistical Software 45, No. 7, Dec. 12, 2011.

* cited by examiner

| Sno | Scenario Id | TestID | TestCaseName | BusinessScenario | Input:Username | Input:Password | Input: | Input:VERSIONTAG | Input:MESSAGEID | Input:ENTITY | Input:APPCODE |
|---|---|---|---|---|---|---|---|---|---|---|---|
| | 502 | 504 | 506 | 508 | 510 | 512 | 514 | 516 | 518 | 520 | 522 | 524 |
| 1 | Scenario_1 | 0001 | Mrp_ReceiveRestricted_ETS2ASJ_POS_01 | Positive | ETS | letmein | | 0001 | IWTSTETS2ASJPOS01 | ASJ-1306 | ASJ24296 |
| 2 | Scenario_1 | 0002 | Mrp_ReceiveRestricted_ETS2ASJ_POS_02 | Positive | ETS | letmein | | 0001 | IWTSTETS2ASJPOS02 | ASJ-1306 | ASJ24296 |
| 3 | Scenario_1 | 0003 | Mrp_ReceiveRestricted_ETS2ASJ_Status_NoHit_POS_03 | Positive | ETS | letmein | | 0001 | IWTSTETS2ASJPOS03 | ASJ-1306 | ASJ24296 |
| 4 | Scenario_1 | 0004 | Mrp_ReceiveRestricted_ETS2ASJ_Status_Hit_POS_04 | Positive | ETS | letmein | | 0001 | IWTSTETS2ASJPOS04 | ASJ-1306 | ASJ24296 |
| 5 | Scenario_1 | 0005 | Mrp_ReceiveRestricted_ETS2ASJ_Status_Failed_POS_06 | Positive | ETS | letmein | | 0001 | IWTSTETS2ASJPOS06 | ASJ-1306 | ASJ24296 |
| 6 | Scenario_1 | 0006 | Mrp_ReceiveRestricted_ETS2ASJ_Status_Recheck_POS_08 | Positive | ETS | letmein | | 0001 | IWTSTETS2ASJPOS08 | ASJ-1306 | ASJ24296 |

SYSTEM ARCHITECTURE FRAMEWORK

CROSS-REFERENCE TO RELATED APPLICATION

This application is a continuation of U.S. patent application Ser. No. 15/376,909, entitled SYSTEM ARCHITECTURE FRAMEWORK, filed on Dec. 13, 2016, which is hereby incorporated by reference herein in its entirety.

FIELD OF TECHNOLOGY

This invention relates to system frameworks. More specifically, this invention relates to frameworks that cross multiple system architectures.

BACKGROUND OF THE DISCLOSURE

Message files have typically been used to transmit information. Message files may come in a variety of file formats. Such formats may include all variants of SWIFT (Society for Worldwide Interbank Financial Telecommunications), CNAB240, CRF (Computer Readable Format), all variants of ISO (International Organization for Standardization) PAIN(payments initiation message), all variants of ISO PACS (Payments Clearing and Settlement), all variants of ISO, all variants of ISO CAMT (Cash Management), ACH (Automated clearing house), BAFF (Bank of America format) IFX (Interactive Financial eXchange), SOAP(Simple Object Access Protocol), FLM, FUF, FIX (Intraday Bill Payment-Fix Format) and any other fixed length, CSV (comma separated value) or XML (eXtensible markup language) based file format.

Conventionally, data which was used to create message files was stored and/or maintained in an Excel™ spreadsheet. The Excel™ spreadsheet would hold all of the information from which to create the message files. Typically, the message files were copied and pasted or typed directly into user interfaces for trans-positioning into the message formats. This process was tedious as well as error-prone because of the human error factor associated with the process. In addition, the process was unable to determine or validate the messages to ensure that the messages satisfy the industry standards. In certain instances, messages, including the errors, were sent and the message-receiving entities discovered the errors. This caused difficulties to arise vis-à-vis the relationships between the entities transmitting the messages and the entities receiving the messages.

SUMMARY OF THE DISCLOSURE

A system architecture framework is provided. The system architecture framework may include a message generator. The message generator may be configured to receive at least one computer-readable spreadsheet file. The spreadsheet file may include a plurality of rows. Each row may include a distinct set of data. The spreadsheet file may also include a plurality of columns.

The message generator may be configured to create a plurality of message files. Each message file may correspond to a single row of data included in the spreadsheet file.

The framework may include a message transmitter. The message transmitter may be configured to transmit each of the plurality of message files. At times, the plurality of files may be transmitted to a server. The server may be a UNIX-based server. The UNIX-based server may be located in a different location than the message generator.

In some embodiments, the plurality of files may be transmitted in batches—i.e., a collection of files may be transmitted together. In other embodiments, the plurality of files may be transmitted serially—i.e., each file may be transmitted on its own.

The framework may include a shell script. The shell script may be a Visual Basic™ shell script. The shell script may be located on the UNIX-based server. The shell script may be configured to handshake with the message generator. Handshaking between the shell script and the message generator may instantiate a communication channel between the UNIX-based server and the message generator. The shell script may also be configured to transmit an instruction to the message generator via the communication channel. The instruction may direct the message generator to initiate message transmission. The message transmission initiation may be triggered in response to the shell script determining that the message generator has completed the message generation.

The framework may include an output retriever. The output retriever may be associated with the UNIX-based server. The output retriever may be configured to retrieve the message files.

The framework may also include a message validation appliance. The message validation appliance may be configured to perform at least one validation test on each of the message files. The validation test may compare at least one of the message files to the corresponding row in the spreadsheet file. The validation test may ensure that each of the created message files is correct.

The framework may also include a report generator. The report generator may be configured to generate a report. The report may include data. The data may relate to the created message files. The data may relate to the transmission of the message files. The data may relate to the validation of the message files.

The message generator, the message transmitter, the output retriever, the message validation appliance and/or the report generator may be decouple-able from the system architecture framework(s). In its decoupled state, the message generator may maintain its capabilities to receive a spreadsheet file and create a plurality of message files from the spreadsheet file in an environment outside of the system architecture framework(s). In its decoupled state, the message transmitter may maintain its capabilities to transmit the plurality of message files in an environment outside of the system architecture framework(s). In its decoupled state, the output retriever may maintain its capabilities to retrieve the message files in an environment outside of the system architecture framework(s). In its decoupled state, the message validation appliance may maintain its capabilities to perform validation test(s) on each of the message files in an environment outside of the system architecture framework(s). In its decoupled state, the report generator may maintain its capabilities to generate report(s) in an environment outside of the system architecture framework(s).

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

A method for operating a system architecture framework is provided. The method may include receiving at least one computer-readable spreadsheet file. The method may include receiving a plurality of spreadsheet files. The receiving may occur at a message generator. The message generator may be included in the system architecture framework. The spreadsheet file may include a plurality of rows. Each row may include a distinct set of data.

The method may include creating a plurality of message files. The creating may occur at the message generator. Each message file may correspond to a single row of data included in the spreadsheet file.

The method may include transmitting the plurality of message files. A message transmitter may transmit the plurality of message files. The message files may be transmitted to a server. The server may be a UNIX-based server. The UNIX-based server may be located in a different location than the message generator.

The method may include handshaking. The handshaking may be initiated by a shell script. The shell script may be located on the UNIX-based server. The shell script may handshake with the message generator. The handshaking may instantiate a communication channel between the UNIX-based server and the message generator.

The method may include transmitting an instruction. The recipient of the instruction may be the message generator. The instruction may include initiating message transmission in response to the shell script determining that the message generator has completed message transmission.

The method may include retrieving the message files by an output retriever. The output retriever may be associated with the UNIX-based server. The output retriever may be included in the system architecture framework.

The method may include performing at least one validation test on one of the message files. The validation test may be performed by a message validation appliance. The validation test may compare a message file to the corresponding row in the spreadsheet file. The validation test may ensure that each created message file is correct.

The method may include generating a report. The report may be generated by a report generator. The report generator may be included in the system architecture framework. The report may include data relating to the created message files. The report may include data relating to the transmission of the message files. The report may include data relating to the validation of the message files.

It should be appreciated that the message generator, the message transmitter, the output retriever, the message validation appliance and the report generator may be decoupleable from the system architecture framework. In each tool's decoupled state, each tool may maintain its capabilities to perform its respective tasks. This may be useful in the event that a specific tool is needed but cannot or does not require processing through the entire system architecture framework.

In some embodiments, the computer-readable spreadsheet file may be an Excel™ spreadsheet file.

The message file may be a delimited message file, a canonical message file, a length-based message file or a combination of message file types. A delimited message may be a message where the data elements are separated by a delimiter. Some examples of delimiters are white space, tabs and commas. A delimited message file type may include CSV and TSV (tab separated value). A canonical message may be a universal type message file. The data elements included in a canonical message file may be separated by indicators. The indicators in a canonical message may be defined by a user. A canonical message file may include an XML message file type. A length-based message file may be a message file where the data elements included in the message file are found in specific locations of the message file. For example, line 2, characters 20-38 may include a specific data element. A length-based message file may include a SWIFT message file type and a CNAB240 message file type.

The message file may also be a BAI message file, a BAI2 message file, a CRF message file, an ISO message file, an ISO PAIN message file, an ISO PACS message file, an ISO CAMT message file, an ACH message file, a BAFF message file, an IFX message file, a SOAP message file, a FLM message file, a FUF message file, a FIX message file or any other suitable message file.

In some embodiments, the report may be presented in the format of an Excel™ spreadsheet. In other embodiments, the report may be presented in the format of a Word™ document. In yet other embodiments, the report may be presented in the format of a text file. In yet other embodiments, the report may be presented in the format of a PowerPoint™ presentation. The report may be created and/or presented in any other suitable file format.

The method may include determining that a row, included in the spreadsheet file, is incomplete. The method may include attempting to retrieve data corresponding to the incomplete data element upon the determination of at least one incomplete data element included in the row. The data corresponding to the incomplete data element may be retrieved from a database. The database may comprise historical information relating to historical message files. The method may compare the row including the incomplete data element to the message files included in the database. The method may retrieve one or more historical message files that are similar to the incomplete spreadsheet row. The method may determine, above a threshold level of confidence, that the missing data element may be the same as a similar historical message file. The level of confidence may be determined based on a number of factors. Some of the factors may include which column is missing from the message file, how many columns there are in the message file, how similar the spreadsheet row is to the historical message file, the name of the message transmitter and/or the name of the message recipient. When the method determines, above a threshold level of confidence, that the missing data element may be the same as the data element included in the similar historical message file, the method may include retrieving the data element.

In some embodiments, the method may populate the row with the data element retrieved from the database. In other embodiments, the method may populate the message file with the data element retrieved from the database.

The method may include creating a complete message file. The complete message file may correspond to the incomplete row. The message file may be created using the data included in the incomplete spreadsheet row and data element(s) retrieved from the database.

At times, although the method may attempt to retrieve the missing data element, the method may be unsuccessful. The method may also include creating a message file that corresponds to the incomplete row.

At times, when the method successfully retrieves the missing data element, the method may include markedly identifying, in the report, the incomplete data element. The method may also include markedly identifying, in the report, the retrieved data corresponding to the incomplete data element. The marked identification may occur upon the determination of the at least one incomplete data element and/or upon the creation of a message file that corresponds to the incomplete row.

At times, the method may fail to retrieve data corresponding to the incomplete data element. The method may include creating an incomplete message file corresponding to the incomplete spreadsheet row. The method may include markedly identifying, in the report generated by the report generator, the incomplete data element and incomplete message file. The creation of the incomplete message file, the marked identification of the incomplete data element and/or the marked identification of the incomplete message file may occur upon the determination of the at least one incomplete data element and/or upon the failure to retrieve data corresponding to the incomplete data element.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
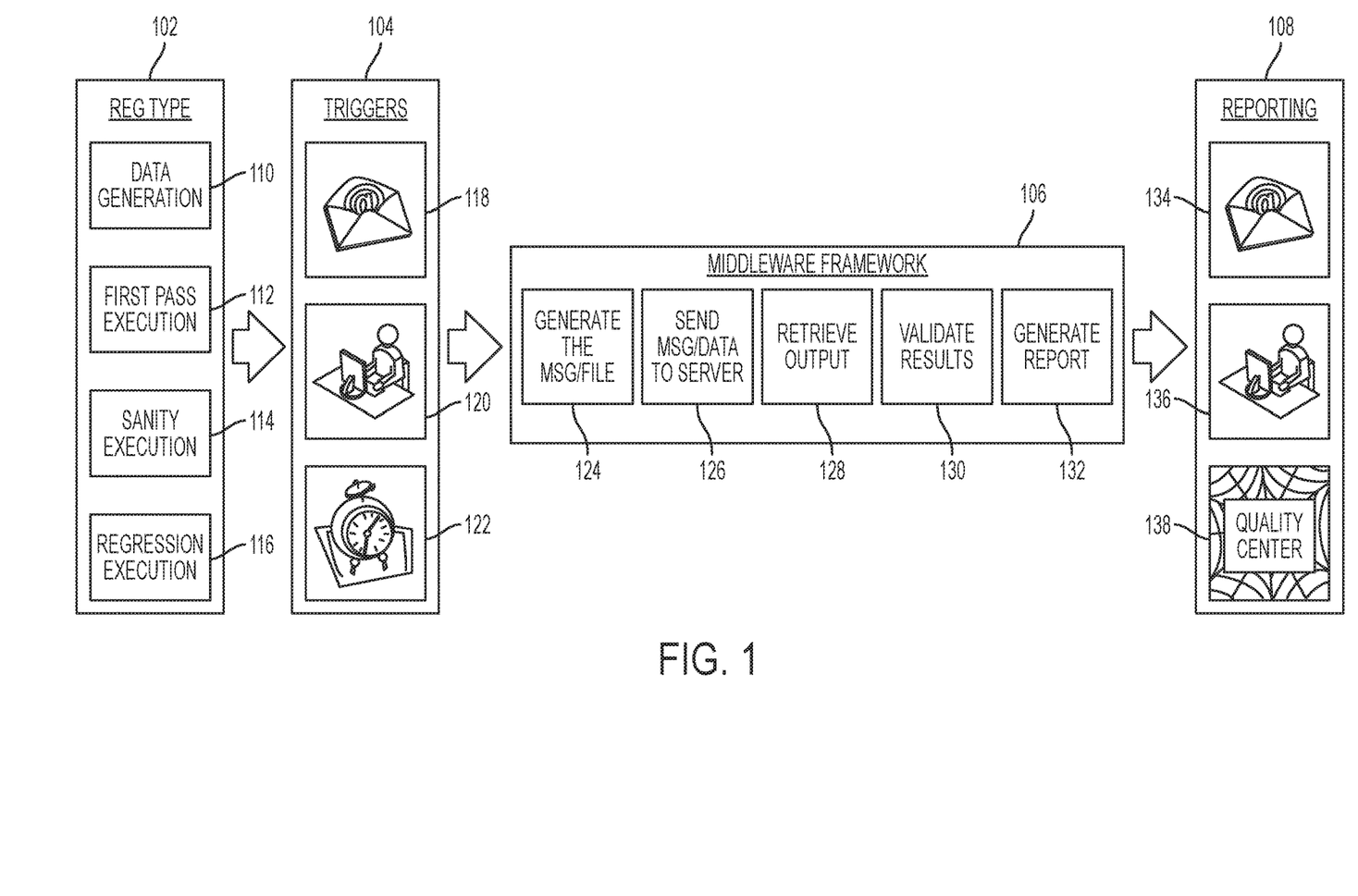
FIG. 1 shows an illustrative flow diagram according to certain embodiments.

FIG. 1 shows an illustrative flow chart. Reg type section 102 may be a section from which a spreadsheet file containing message data may be generated or retrieved. Reg type section 102 may include data generation 110. Data generation 110 may include generating data. The generated data may be testing data. The generated data may include a spreadsheet file. Reg type section 102 may also include first pass execution 112. First pass execution 112 may include the test results of a software test following the first run of the test. The results of first pass execution 112 may include a spreadsheet file.

Reg type section 102 may also include sanity execution 114. Sanity execution 114 may be a method of testing software. Sanity execution 114 may include surface-level testing of a software section. A sanity test may be a manual check of whether the entirety of the functionality associated with the software works in a proper way. Sanity testing may not be script-based. Testers using sanity execution should preferably not know details of the software that they are testing. Sanity execution 114 may also produce a spreadsheet file.

Reg type section 102 may also include regression execution 116. Regression execution 116 may be a method of testing software. Regression execution 116 may include in-depth software testing. Regression execution 116 may include the use of automated tools as well as manual input to complete the tests. Regression testing may be, at least in part, script-based. Regression execution 116 may also produce a spreadsheet file.

The spreadsheet results generated and/or retrieved from the subsections included in reg type section 102 may be transmitted to framework 106 via triggers included in trigger section 104. Trigger section 104 may include a variety of triggers that may cause spreadsheets to be transmitted from reg type section 102 to framework 106. The transmitted spreadsheets may require execution by framework 106. Triggers section 104 may include email icon 118. Email icon 118 may indicate that framework 106 may be initiated in response to receipt of an email. Triggers section 104 may also include personnel icon 120. Personnel icon 120 may indicate that framework 106 may be initiated in response to an instruction from a designated personnel. Triggers 104 may also include timer icon 122. Timer icon 122 may indicate that framework 106 may be initiated after a certain interval of time or at a specific time.

Framework 106 may include a plurality of appliances. Each of the appliances may perform a specific task or plurality of tasks. Framework 106 may include appliance 124. Appliance 124 may generate a message, a file, a plurality of messages and/or a plurality of files. Appliance 124 may include or have access to necessary resources in order to generate the message and/or file. The resources may include one or more databases. In certain embodiments, the databases may include data that may enable completion of incomplete data files. The message may be one of the types of messages discussed above in paragraph 0037 of the detailed description of the disclosure section.

Framework 106 may also include appliance 126. Appliance 126 may send messages and/or data to a server or plurality of servers. The server(s) may be UNIX-based servers. The server(s) may be Windows-based servers. The server(s) may be any other suitable type of server. The servers may enrich and/or change the messages and/or data. In the event that the messages were sent in an incomplete state to the servers, the servers may determine which elements of the message(s) were incomplete. The servers may mine one or more databases to determine information that may complete the messages. In certain embodiments, the determined information may be included in the message file only if the determined information matches the missing information with more than a predetermined level of confidence.

Framework 106 may also include appliance 128. Appliance 128 may retrieve output from the servers. The output may include messages and/or files. The messages and/or files may have been enriched at the servers.

Framework 106 may also include appliance 130. Appliance 130 may validate the results of the previously used appliances. The results may be the message files. The results may be the enriched message files. The validation appliance may compare a message file to the row in the spreadsheet file from which the message file was created. The validation appliance may compare a plurality of message files to a plurality of rows included in the message files. The validation appliance may ensure that the created messages correspond to the rows in the spreadsheet files. The validation appliance may also ensure that no errors exist in the created message files.

Framework 106 may also include appliance 132. Appliance 132 may be a report generator. The report generator may generate reports. The reports may include information relating to the created messages, the validation tests and results, the spreadsheet rows, the data used to enrich certain message files and any other suitable information and/or data. The reports may be transmitted to specific entities included in reporting section 108.

Reporting section 108 may include a variety of methods and destinations to which the reports may be transmitted. Reporting section 108 may include email icon 134. Email icon 134 may symbolize that the reports may be emailed to one or more recipients. Reporting section 108 may include personnel icon 136. Personnel icon 136 may symbolize that the reports may be transmitted to one or more personnel. Reporting section 108 may include quality center icon 138. Quality center icon 138 may symbolize that the reports may be transmitted to one or more quality centers. The quality centers may review the reports for quality control of the reports.

Figure 2:
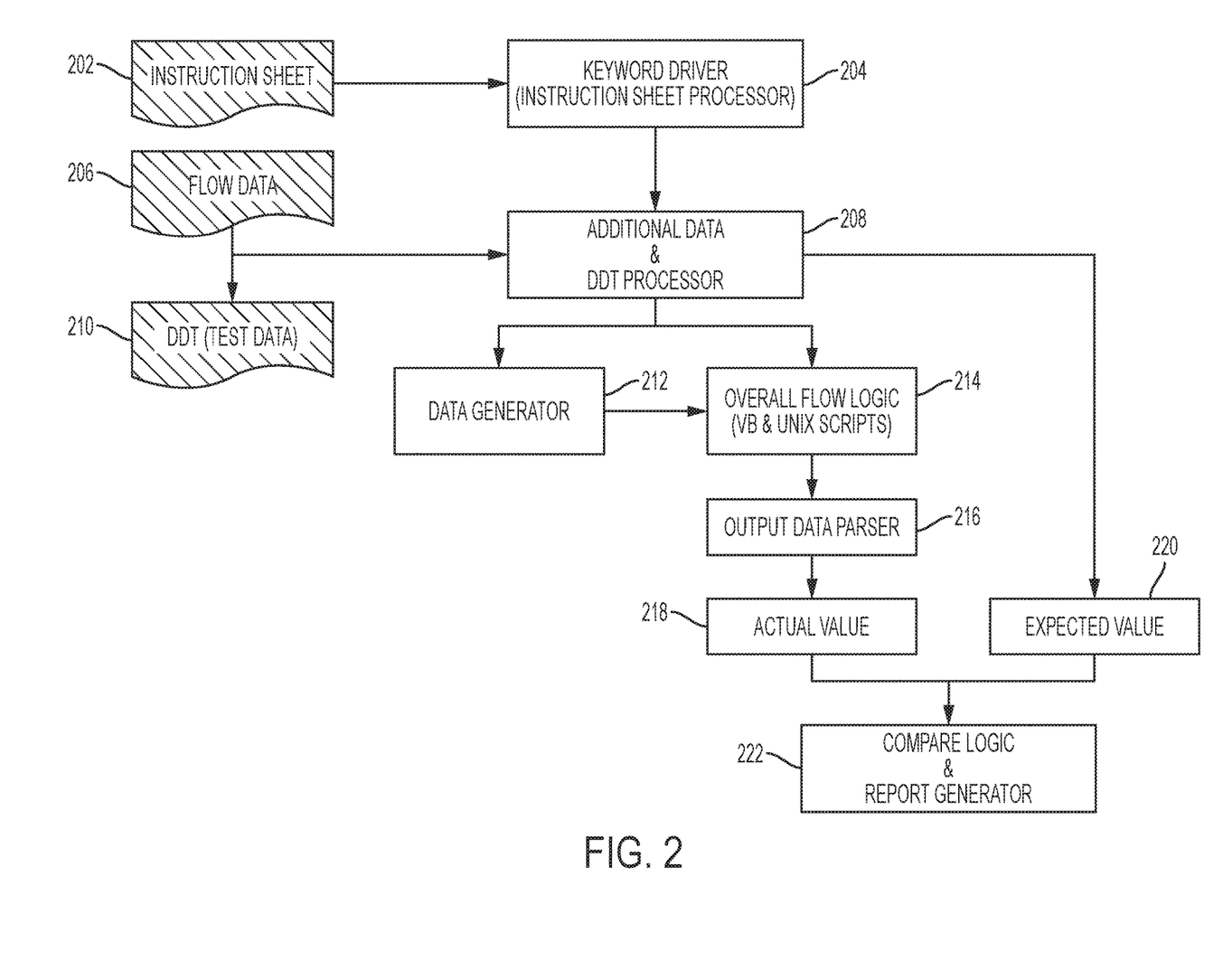
FIG. 2 shows another illustrative flow diagram according to certain embodiments.

FIG. 2 shows an illustrative flow chart. Step 202 shows an instruction sheet. The instruction sheet may be a spreadsheet. The spreadsheet may be an Excel™ spreadsheet. The instruction sheet may be passed to a keyword driver as shown in step 204. A keyword driver may be an instruction sheet processor. The instruction sheet processor may be a message generator.

Flow data 206, which may include message data, and/or data driven test data, which may include additional data mined from a database, may be joined together at step 208,—i.e., additional data and data driven test processor. The data may be processed. The expected value of the post-processed messages may be included in expected value 220.

Additional data and data driven test processor 208 may transmit data to data generator 212 and overall flow logic 214. Data generator 212 may generate test data with which to compare the real data. The data generated by data generator 212 may be transmitted to overall flow logic 214. Overall flow logic, which may be created from visual basic and UNIX scripts, may process the data. The data may be transmitted to output data parser 216. Output data parser 216 may parse the resultant data into a set of results, which may be actual value 218. The actual resultant value may be compared against the expected value at 222. The results of the comparison may be compiled into reports. The reports may be transmitted to one or more relevant recipients.

Figure 3:
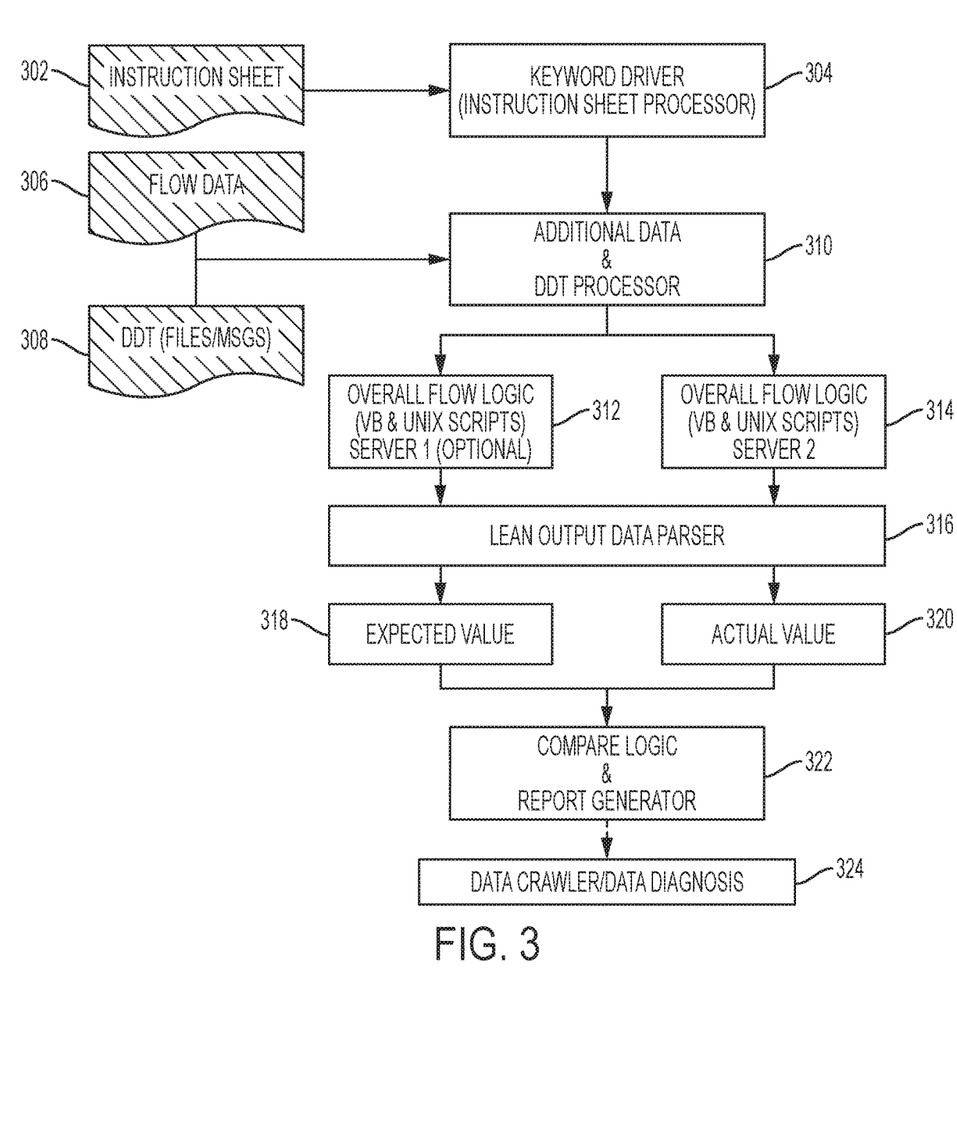
FIG. 3 shows another illustrative flow diagram according to certain embodiments.

FIG. 3 shows another illustrative flow chart. Instruction sheet 302, which may be an Excel™ spreadsheet may be transmitted to keyword driver 304. Keyword driver 304 may be an instruction sheet processor. Keyword driver 304 may be a message generator. Keyword driver 304 may generate messages or files. The generated messages or files may be included in data driven testing (files/messages) store 308. Flow data store 306 may include data. The data may be data retrieved from a database. The data may be historical message data. Both flow data 306 and data driver testing (files/messages) data 308 may be joined at additional data and data driven testing processor 310.

In the flow chart shown in FIG. 3, the additional data and data driven processor 310 may transmit the joined data to server 1, as shown at 312 and server 2, as shown at 314. At server 1, overall flow logic may be performed on the data. The overall flow logic may comprise Visual Basic™ and UNIX™ scripts. At server 2, overall flow logic may also be performed on the data. The overall flow logic may also comprise Visual Basic™ and UNIX™ scripts. Lean output data parser 316 may parse the output from server 1 and the output from server 2 into two sets of results. The results from server 1 may be the expected result set value as shown at 318. The results from server 2 may be the actual result set value, as shown at 320. The results of server 1 and the results of 2 may be compared at 322. The logic used in server 1 and the logic used in server 2 may also be compared at 322. The results of the comparisons, which may include similarities as well as discrepancies between the two result sets, may be included in a generated report. The generated report may be transmitted to relevant entities. The reports may be inspected to ensure that the messages do not include missing data. In the event that a message is missing data, data crawler/data diagnosis tool 324 may determine the missing data. Data crawler/data diagnosis tool 324 may also retrieve the missing data. Data crawler/data diagnosis tool 324 may also, if appropriately configured, enter the missing data into the incomplete message.

Figure 4:
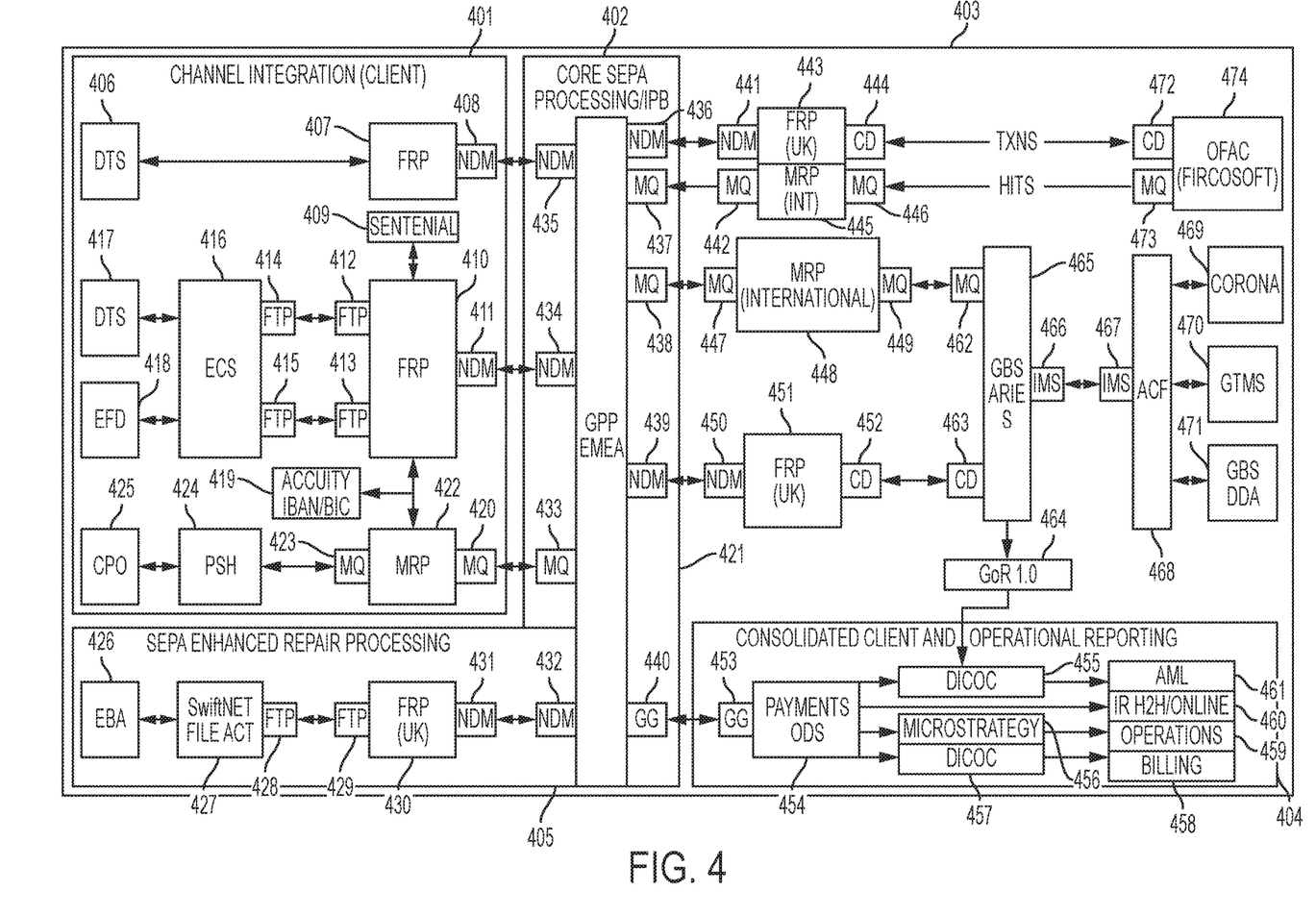
FIG. 4 shows an illustrative architecture diagram according to certain embodiments.

FIG. 4 shows an exemplary architecture according to certain embodiments. The framework described in connection with FIG. 1 may be located on, and/or form part of, such an exemplary architecture. The architecture may include a plurality of sections. The plurality of sections may include channel integration (client) section 401, SEPA Enhanced Repair Processing section 405, Core SEPA Processing/IPB section 402, Consolidated Client and Operational Reporting section 404 and unincorporated section 403. SEPA may be multi-user, multi-lingual, multi-platform solution to facilitate access to Interbank and Corporate networks to banks. SEPA may be based on J2EE technology.

Channel integration (client) section 401 may include DTS (distributed threads) 406. DTS 406 may communicate with FRP (functional requirements planning) middleware system 407. FRP 407 may communicate with GPP EMEA 421 via NDM 408 on the FRP 407 side and NDM (network data mover) 435 on the GPP (genasys positioning platform) EMEA (Europe, Middle East and Asia) side.

GPP EMEA 421 may communicate with FRP middleware system 410 via NDM 434 on the GPP EMEA side and NDM 411 on the FRP 410 side. FRP 410 may communicate with FCS (federated control system) 416 at a plurality of communication points. One communication point may be FTP (file transfer protocol) 412 on the FRP 410 side, which may communicate with FTP 414 on the FCS 416 side. Another communication point may be FTP 413 on the FRP 410 side, which may communicate with FTP 415 on the FCS 416 side.

FCS 416 may communicate with DTS 417. FCS 416 may also communicate with EFD (engineering and facility database) 418.

FRP 410 may also communicate with Accuity IBAN/BIC 419. Accuity IBAN/BIC may be a look up tool designed to improve the operational efficiency and payment straight through processing of a system.

FRP 410 may also communicate with MRP (materials requirements planning) middleware system 422. MRP 422 may communicate with PSH (primary spectrum holder) 424, via MQ (message queue) 423 on the MRP 422 side. MQ may be IBM's messaging solution for enterprise and IBM's message oriented middleware offering. PSH 424 may also communicate with CPO 425.

FRP 410 may also communicate with Sentenial 409.

MRP 422 may also communicate with GPP EMEA 421 via MQ 420 on the MRP 422 side and MQ 433 on the GPP EMEA 421 side.

GPP EMEA 421 may communicate with FRP 430 via NDM 431 on the FRP 430 side and NDM 432 on the GPP EMEA side. FRP 430 may also communicate with SwiftNET File ACT 427 (a secure channel for large files of structured messages, operational data and/or reports). SwiftNET File ACT 427 may communicate with FRP 430 via FTP 428 on the SwiftNET File ACT 427 side and FTP 429 on the FRP 430 side.

SwiftNET File ACT 427 may also communicate with EBA 426 (an application domain).

GPP EMEA 421 may communicate with FRP 443 via NDM 436 on the GPP EMEA side and NDM 441 on the FRP side. FRP 443 may also communicate with OFAC (Office of Foreign Assets Control) (Fircosoft) 474. Fircosoft™ may be a creator of filtering solutions, and may be part of Accuity™, a provider of global payment routing data and anti-money laundering solutions to banks and businesses worldwide. FRP 443 may communicate with OFAC (Fircosoft) 474 via CD 444 on the FRP side and CD 472 on the OFAC (Fircosoft) side.

GPP EMEA 421 may also communicate with MRP (INI) 445 via MQ 437 on the GPP EMEA side and MQ 442 on the MRP side. MRP may also communicate with OFAC (Fircosoft) 474 via MQ 446 on the MRP side and MQ 473 on the OFAC (Fircosoft) side.

GPP EMEA 421 may communicate with MRP (international) 448 via MQ 438 on the GPP EMEA side and MQ 447 on the MRP side. MRP 448 may also communicate with GBS (global payment system) Aries (a collection of modules that together provide a coherent business function) 465 via MQ 449 on the MRP side and MQ 462 on the GBS Aries side.

GPP EMEA 421 may communicate with FRP (UK) 451 via NDM 439 on the GPP EMEA side and NDM 450 on the FRP (UK) 451 side. FRP 451 may communicate with GBS Aries 465 via CD 452 on the FRP side and CD 463 on the GBS Aries side.

GBS Aries 465 may communicate with ACF (acquisition and control framework) 468, via IMS (an integrated network of telecommunications carriers that facilitates the use of internet protocol for packet communications in all known forms over wireless or landline communications) 466 on the GBS Aries side and IMS 467 on the ACF side.

ACF 468 may communicate with Corona (a software development kit) 469, GTMS 470 and GBS DDA (global payment system direct deposit account) 471.

GBS Aries 465 may communicate with GoR 1.0 464. GoR 1.0 464 may communicate with DiCOC 455 included in Consolidated Client and Operational Reporting section 404.

GPP EMEA may communicate with payments ODS (one data source) 454, via GG (golden gate protocol) 440 on the GPP EMEA side and GG 453 on the payments 454 side. Payments 454 may communicate with DiCOC 455. DiCOC 455 may communicate with AML 461. Payments 454 may also communicate with IR H2H (host to host)/Online 460. Payments 454 may also communicate with Microstrategy (an enterprise business intelligence software platform that supports interactive dashboards, score cards, highly formatted reports, ad hoc queries, alerts and/or other suitable information) 456. Microstrategy 456 may also communicate with operations 459.

Payments 454 may also communicate with DiCOC 457. DiCOC 457 may also communicate with billing 458.

Figure 5:
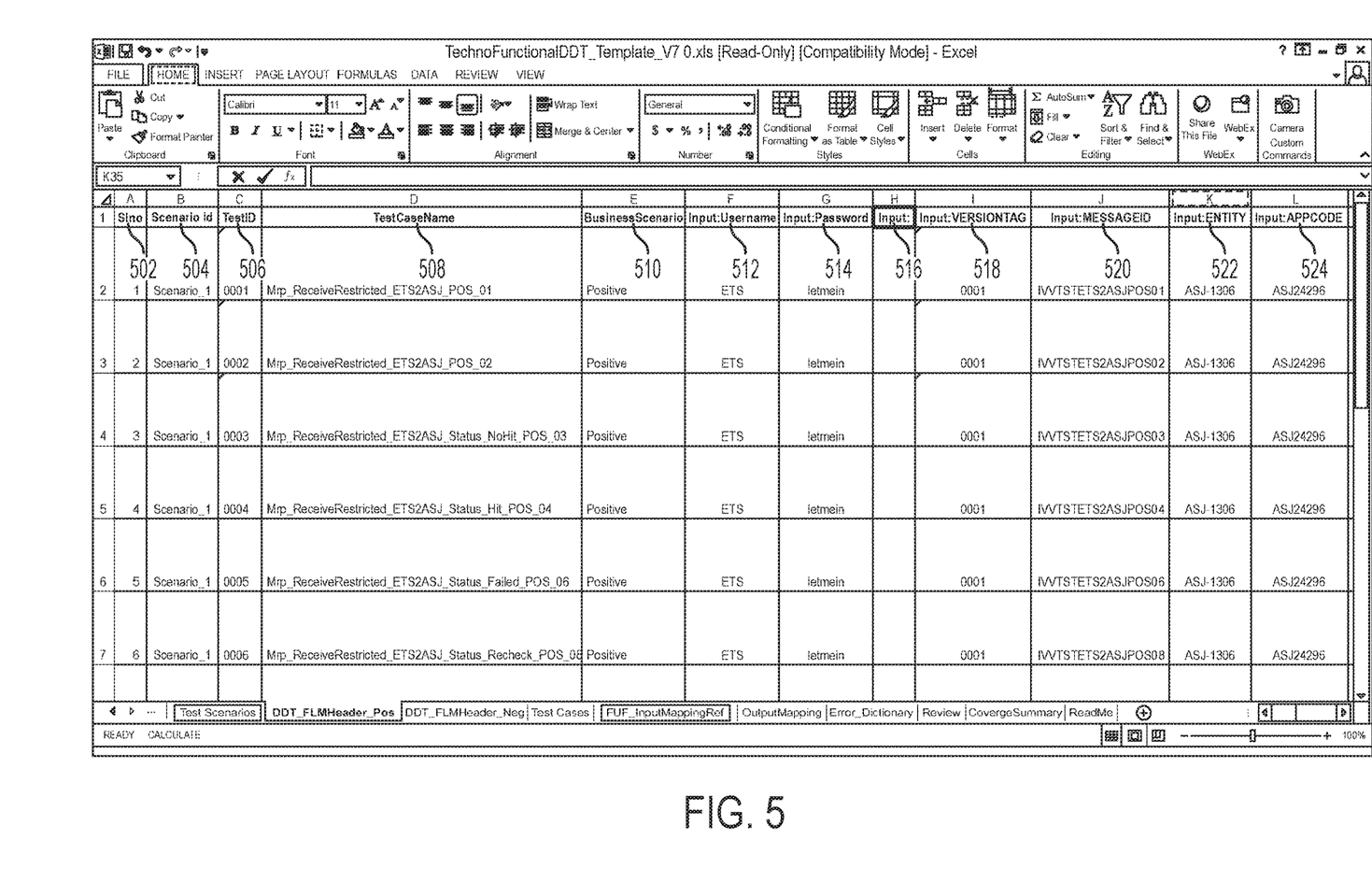
FIG. 5 shows a illustrative Microsoft Excel™ spreadsheet that includes data according to certain embodiments.

FIG. 5 shows an exemplary spreadsheet. The spreadsheet may be transmitted to system architecture framework. The spreadsheet may include message data. Each of columns 502, 204, 506, 508, 510, 512, 514, 516, 518, 520 522 and 524 may include different kinds of data. Column 502 may include scenario number data. Column 504 may include scenario identification data. Column 506 may include test identification data. Column 508 may include test case name data. Column 510 may include business scenario data. Column 512 may include username input data. Column 514 may include password input data. Column 516 may include input data. Column 518 may include version tag input data. Column 520 may include message identification data. Column 522 may include entity input data. Column 524 may include application code input data. The data included in each of rows 2-7 in the spreadsheet may be used to create distinct message files.

Figure 6:
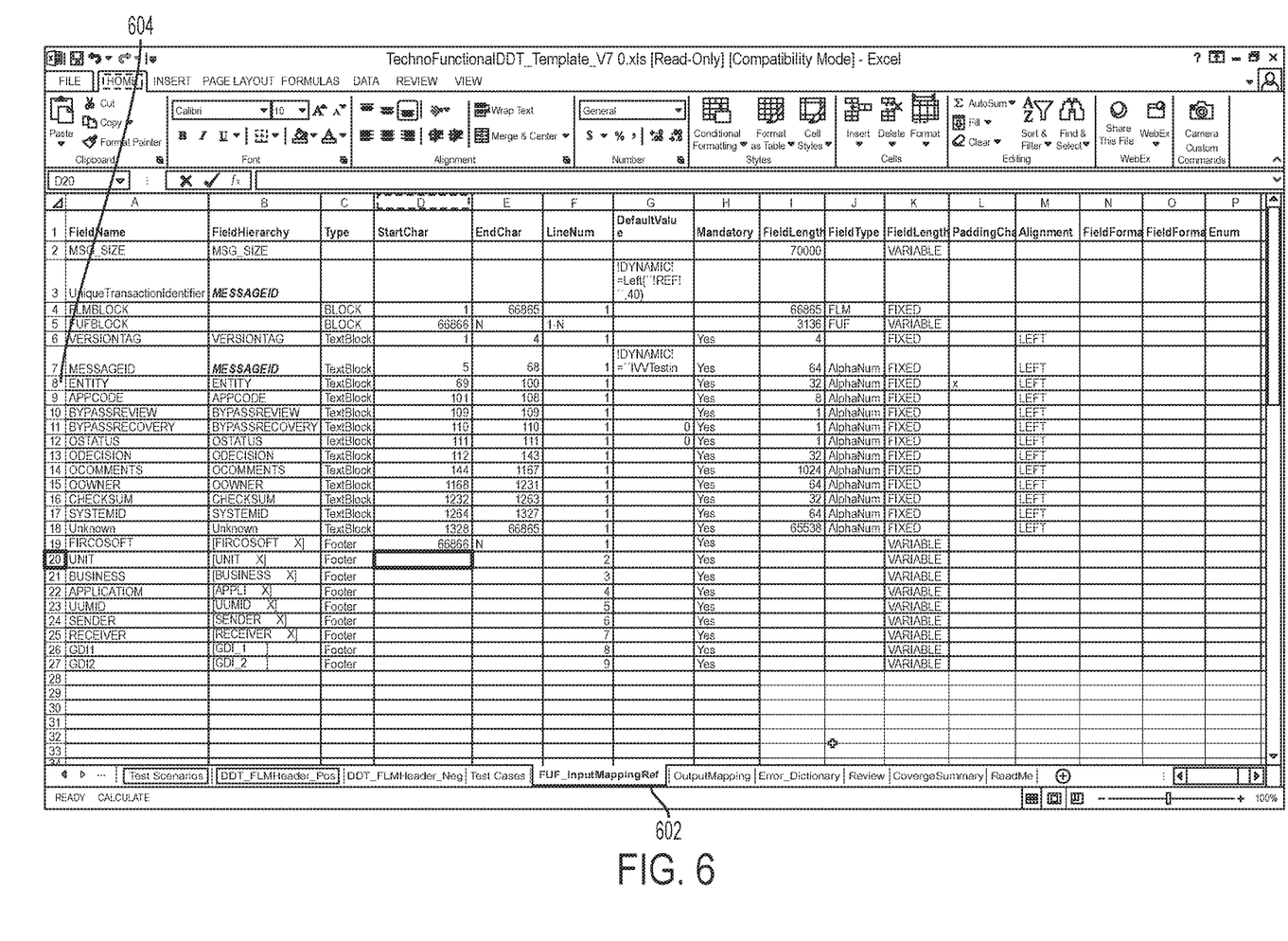
FIG. 6 shows an illustrative Microsoft Excel™ spreadsheet for data mapping according to certain embodiments.

FIG. 6 shows an exemplary mapping spreadsheet. The spreadsheet shown in FIG. 6 may show a framework that describes how to create a message file. The spreadsheet may direct the framework where within the spreadsheet shown in FIG. 5 to pull data with which to create a message file. There may be a different mapping file for each type of message file. The mapping file shown in FIG. 6 may be a mapping reference template for FUF message type, as shown at 602.

Exemplary row 604 may correspond to column 522 in FIG. 5. Row 604 may direct the framework to pull entity field name data element. The entity data element may be included in the field hierarchy entity. Entity data element be a textblock data type. Entity data element may start at character 69 and end at character 100. Entity data element may be found at line number 1. There may be no default value for entity data element. It may be a mandatory data field. It may have a field length of 32. The field type may be alphanumeric. The field length may be a fixed field length. There may be preferably be no padding characters. The alignment may be on the left.

Figure 7:
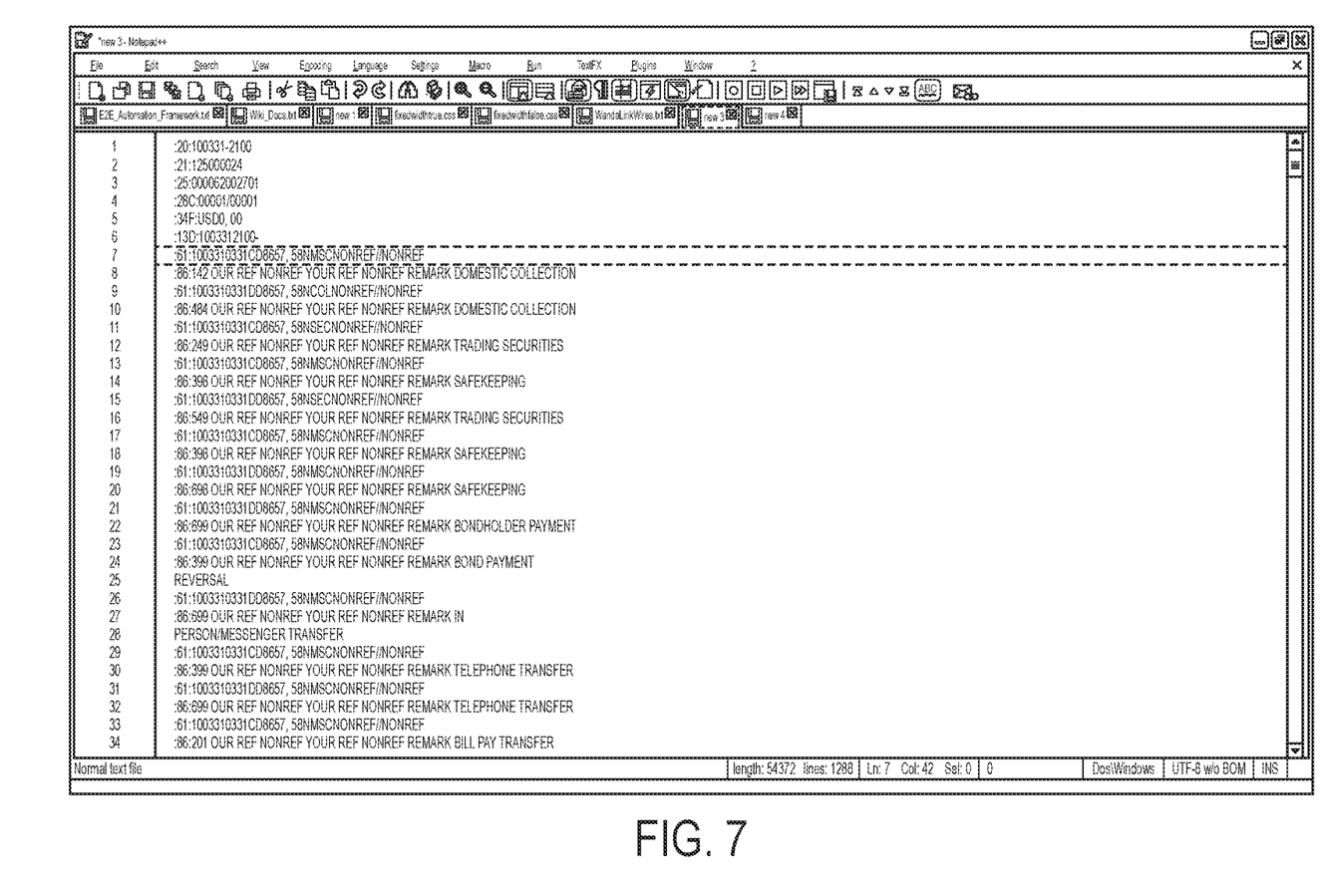
FIG. 7 shows an illustrative SWIFT (Society for Worldwide Interbank Financial Telecommunications) document according to certain embodiments.

FIG. 7 shows an exemplary SWIFT message file. The message file may be created from an Excel™ spreadsheet that includes message data. A SWIFT mapping spreadsheet may be used to facilitate the creation of the SWIFT message file. The SWIFT message may preferably correspond to a single row a spreadsheet file similar to the spreadsheet file shown in FIG. 5.

Figure 8:
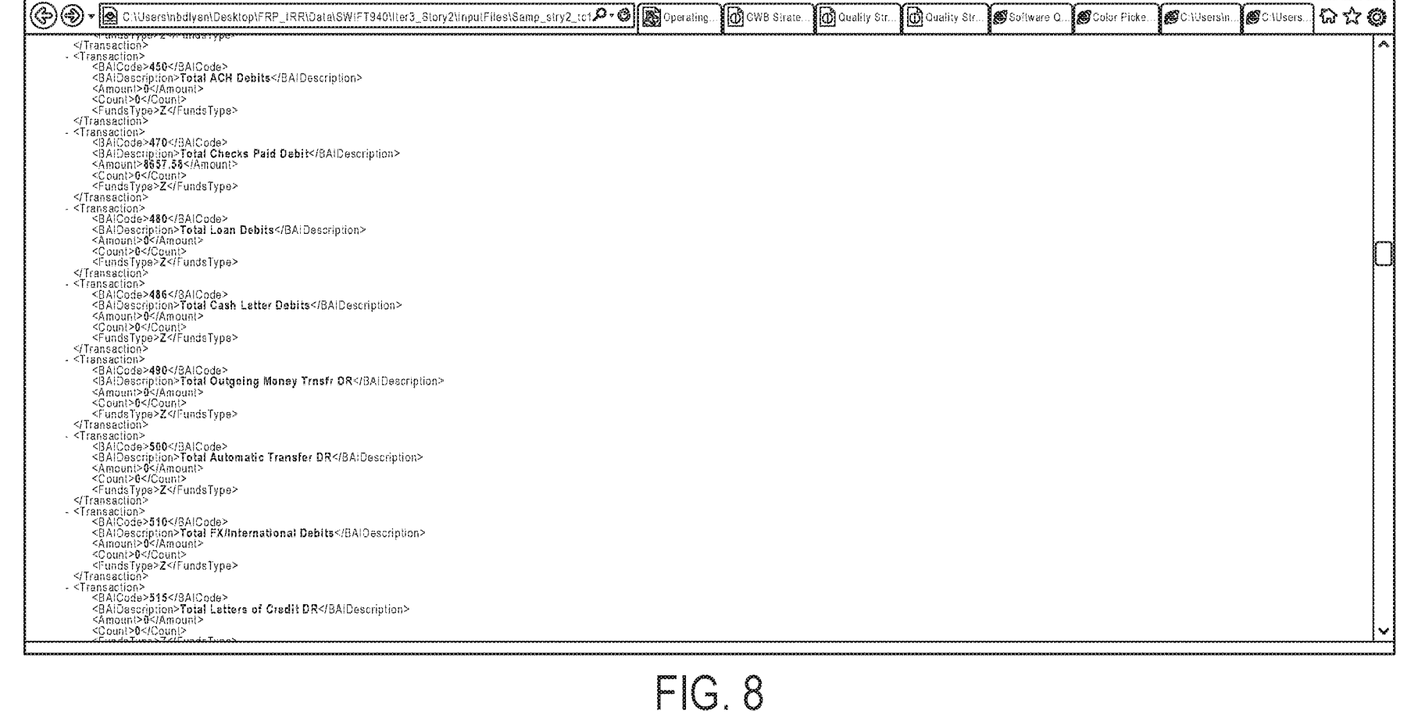
FIG. 8 shows an illustrative XML document according to certain embodiments.

FIG. 8 shows an exemplary XML message file. The message file may be created from an Excel™ spreadsheet that includes message data. An XML mapping spreadsheet may be used to facilitate the creation of the XML message file. The XML message may preferably correspond to a single row in a spreadsheet file similar to the spreadsheet file shown in FIG. 5.

Figure 9:
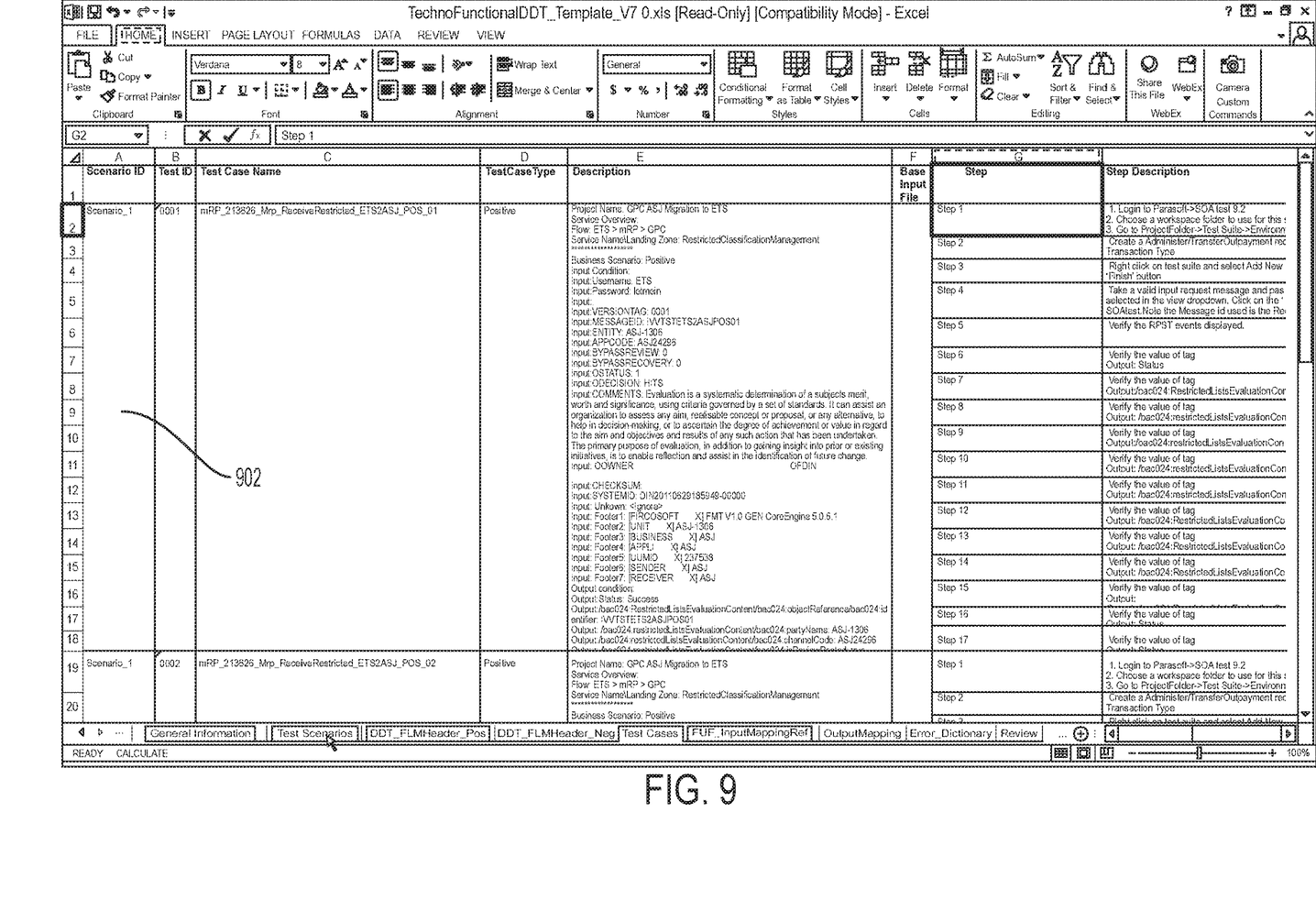
FIG. 9 shows an illustrative Microsoft Excel™ spreadsheet for testing documents according to certain embodiments.

FIG. 9 shows a test case scenario spreadsheet. The test case scenario spreadsheet may include tests. The tests may test the resultant message files against the original spreadsheet files. The testing may ensure that the message files are correct. Test case scenario 902 may include a scenario id number, a test id number, a test case name, a test case type, a test description, a base input file (which may be the original spreadsheet file), a plurality of steps which enable the test operation and/or a description of each of the steps.

Thus, methods and apparatus for a system architecture framework have been provided. Persons skilled in the art will appreciate that the present invention can be practiced by other than the described embodiments, which are presented for purposes of illustration rather than of limitation. The present invention is limited only by the claims that follow.

What is claimed is:

1. A method for operating a system architecture framework, the method comprising:
    receiving, at a message generator included in the system architecture framework, at least one computer-readable spreadsheet file, said spreadsheet file comprising a plurality of rows, wherein each of said rows includes a distinct set of data;
    creating, at the message generator, a plurality of message files, wherein each message file corresponds to a single row of data included in the spreadsheet file, wherein each message file is:
        a BAI message file;
        a BAI2 message file;
        a CRF message file;
        an ISO message file;
        an ISO PAIN message file;
        an ISO PACS message file;
        an ISO CAMT message file;
        an ACH message file;
        an IFX message file;
        a SOAP message file; or
        a FIX message file;
    transmitting, by a message transmitter included in the system architecture framework, the plurality of message files to a UNIX-based server located in a different location than the message generator;
    handshaking, by a shell script located on the UNIX-based server, with the message generator, thereby instantiating a communication channel between the UNIX-based server and the message generator;
    transmitting an instruction to the message generator to initiate message transmission is response to the shell script determining that the message generator has completed the message generation;
    retrieving the message files by an output retriever associated with the UNIX-based server, said output retriever included in the system architecture framework;
    performing, by a message validation appliance included in the system architecture framework, at least one validation test on each of the message files, said validation test comparing each message file to the corresponding row in the spreadsheet file, said validation test ensuring that each created message file is correct;
    generating a report by a report generator included in the system architecture framework, said report including data relating to the created message files, data relating to the transmission of the message files and data relating to the validation of the message files; and
wherein:
    the system architecture framework includes a plurality of decouple-able tools, the decouple-able tools comprising the message generator, the message transmitter, the output retriever, the message validation appliance and the report generator;
    in a decoupled state, outside of the system architecture framework:
        the message generator is operable to maintain its capabilities to receive a spreadsheet file and create a plurality of message files from the spreadsheet file;
        the message transmitter is operable to maintain its capabilities to transmit the plurality of message files;
        the output retriever is operable to maintain its capabilities to retrieve message files;
        the message validation appliance is operable to maintain its capabilities to perform at least one validation test on each of the message files; and
        the report generator is operable to maintain its capabilities to generate a report;
    each of the decouple-able tools can be individually decoupled and, in its decoupled state, perform its respective capabilities without requiring processing through the entire system architecture framework; and
    when a row, included in the spreadsheet file, is incomplete, the message generator is operable to:
        determine at least one incomplete data element in the incomplete row;
        retrieve information corresponding to the incomplete data element from a database, the database comprising historical information relating to historical message files;
        determine that the retrieved information corresponding to the incomplete data element is above a threshold level of confidence; and
        create a complete message file corresponding to the incomplete row using the information included in the incomplete row and the information retrieved from the database.

2. The method of claim 1, wherein each message file is:
    delimited;
    canonical;
    length-based; or
    a combination of two or more of the above.

3. The method of claim 1, wherein the report is a spreadsheet.

4. The method of claim 3, wherein, upon the determination of at least one incomplete data element and upon the creation of a message file that corresponds to the incomplete row, the method further includes markedly identifying, in the report, generated by the report generator:
    the incomplete data element; and
    the retrieved data corresponding to the incomplete data element.

5. The method of claim 4, wherein, upon determination of at least one incomplete data element and upon failing to retrieve data corresponding to the incomplete data element, the method further includes:
    creating, by the message generator, an incomplete message file corresponding to the incomplete spreadsheet row using the information included in the incomplete spreadsheet row; and markedly identifying, in the report generated by the report generator, the incomplete data element and the incomplete message file.

\* \* \* \* \*